(12) United States Patent
Matsuda et al.

(10) Patent No.: US 12,013,410 B2
(45) Date of Patent: Jun. 18, 2024

(54) AUTOMATIC ANALYSIS APPARATUS

(71) Applicant: CANON MEDICAL SYSTEMS CORPORATION, Otawara (JP)

(72) Inventors: Isamu Matsuda, Sakura (JP); Takehiko Oonuma, Oyama (JP); Akiko Tanaka, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 641 days.

(21) Appl. No.: 16/830,907

(22) Filed: Mar. 26, 2020

(65) Prior Publication Data

US 2020/0309803 A1 Oct. 1, 2020

(30) Foreign Application Priority Data

Mar. 27, 2019 (JP) .................................. 2019-060391

(51) Int. Cl.
*G01N 35/02* (2006.01)
*G01N 35/00* (2006.01)
*G01N 35/10* (2006.01)

(52) U.S. Cl.
CPC ....... *G01N 35/025* (2013.01); *G01N 35/0092* (2013.01); *G01N 35/1002* (2013.01)

(58) Field of Classification Search
CPC ............ G01N 35/0092; G01N 35/025; G01N 35/00623; G01N 35/1002; G01N 2035/0444; G01N 2035/0437
See application file for complete search history.

(56) References Cited

U.S. PATENT DOCUMENTS

| 9,134,332 | B2* | 9/2015 | Frey .................... G01N 35/0099 |
| 10,717,087 | B2* | 7/2020 | Yasui ........................ B01L 9/00 |
| 11,275,095 | B2* | 3/2022 | Yoshida ............. G01N 35/1002 |
| 11,313,872 | B2* | 4/2022 | Onuki ................ G01N 35/1002 |
| 2010/0001854 | A1* | 1/2010 | Kojima ............ G01N 35/00584 |
| | | | 702/19 |
| 2013/0122596 | A1 | 5/2013 | Kamihara et al. |

FOREIGN PATENT DOCUMENTS

| JP | 7-280816 A | 10/1995 |
| JP | 09-101311 A | 4/1997 |
| JP | 2000-105239 A | 4/2000 |

* cited by examiner

*Primary Examiner* — Shogo Sasaki
(74) *Attorney, Agent, or Firm* — Oblon, McClelland, Maier & Neustadt, L.L.P.

(57) ABSTRACT

An automatic analysis apparatus of an embodiment includes a holder, a first dispenser, a second dispenser, a detector, a memory, and processing circuitry. The holder movably holds a plurality of reaction vessels. The first dispenser dispenses an analyte into each of the reaction vessels. The second dispenser dispenses a reagent into the reaction vessel. The detector detects light transmitted through the reaction vessel. The memory stores a test order. The processing circuitry controls the holder, the first dispenser, and the second dispenser based on the test order. The processing circuitry determines one of the reaction vessels to be used for measuring the analyte based on the test order, and performs control to collect characteristic data from another of the reaction vessels not used for measuring the analyte while the analyte is measured.

15 Claims, 10 Drawing Sheets

FIG.4
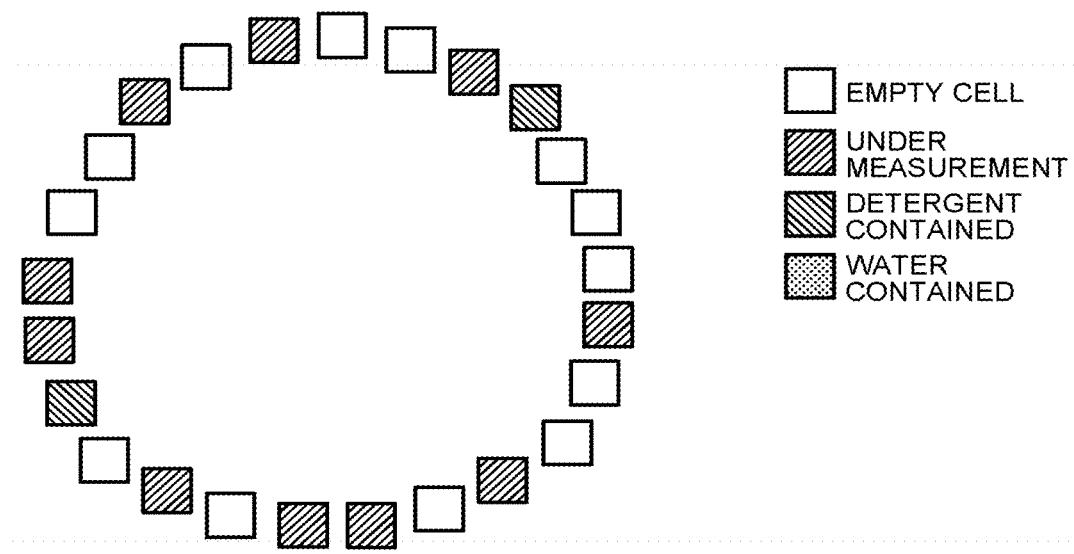
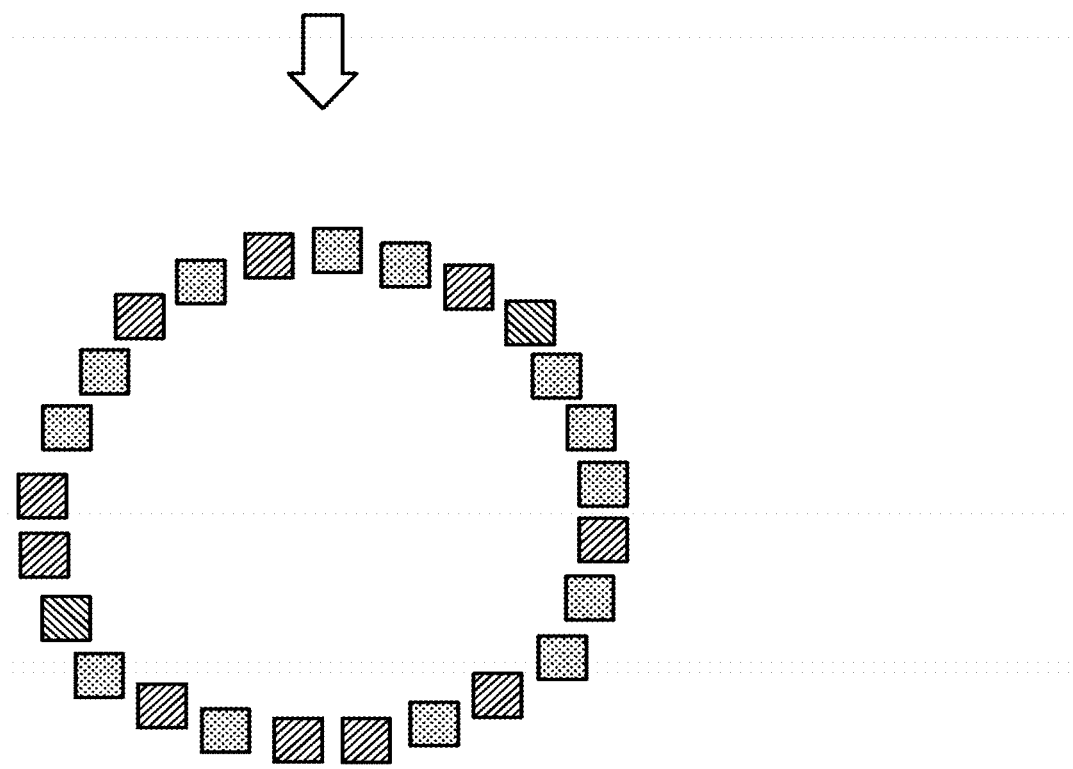

FIG.5A

| REACTION VESSEL NUMBER | WATER BLANK UPDATE DATE/TIME | ABSORBANCE | | | | | | | CELL BLANK | MEASUREMENT USE COUNT |
|---|---|---|---|---|---|---|---|---|---|---|
| | | P1 | P2 | P3 | ... | P32 | P33 | CV | | |
| 1 | 2019/1/1 19:32:02 | 0.002024 | -0.0002 | 0.000393 | ... | 0.000667 | 0.000373 | 0.000353 | 44262 | 0 |
| 2 | 2019/1/1 19:45:12 | 0.000371 | 0.000449 | 0.000586 | ... | 0.000801 | 0.000586 | 0.000149 | 44472 | 1 |
| 3 | 2019/1/1 20:15:26 | 0.000802 | 0.000606 | 0.000802 | ... | 0.000919 | 0.000821 | 0.000156 | 44444 | 4 |
| ... | ... | ... | ... | ... | ... | ... | ... | ... | ... | ... |
| 164 | 2019/1/1 19:31:52 | 0.000391 | 0.000528 | 0.000685 | ... | 0.000509 | 0.000548 | 0.000131 | 44423 | 0 |
| 165 | 2019/1/1 19:31:52 | 0.00094 | 0.00047 | 0.000666 | ... | 0.000764 | 0.000529 | 0.000124 | 44355 | 0 |

FIG.5B

| REACTION VESSEL NUMBER | WATER BLANK UPDATE DATE/TIME | ABSORBANCE | | | | | | | CELL BLANK | MEASUREMENT USE COUNT |
| --- | --- | --- | --- | --- | --- | --- | --- | --- | --- | --- |
| | | P1 | P2 | P3 | ... | P32 | P33 | CV | | |
| 1 | 2019/1/1 19:32:02 | 0.002024 | -0.0002 | 0.000393 | ... | 0.000667 | 0.00373 | 0.000353 | 44262 | 0 |
| | 2019/1/1 12:50:10 | 0.000333 | 0.000444 | 0.000165 | ... | 0.000777 | 0.000111 | 0.000654 | 44302 | 2 |
| | 2019/1/1 7:31:32 | 0.000221 | 0.000367 | 0.000657 | ... | 0.000513 | 0.000279 | 0.000774 | 44220 | 1 |
| | ... | ... | ... | ... | ... | ... | ... | ... | ... | ... |

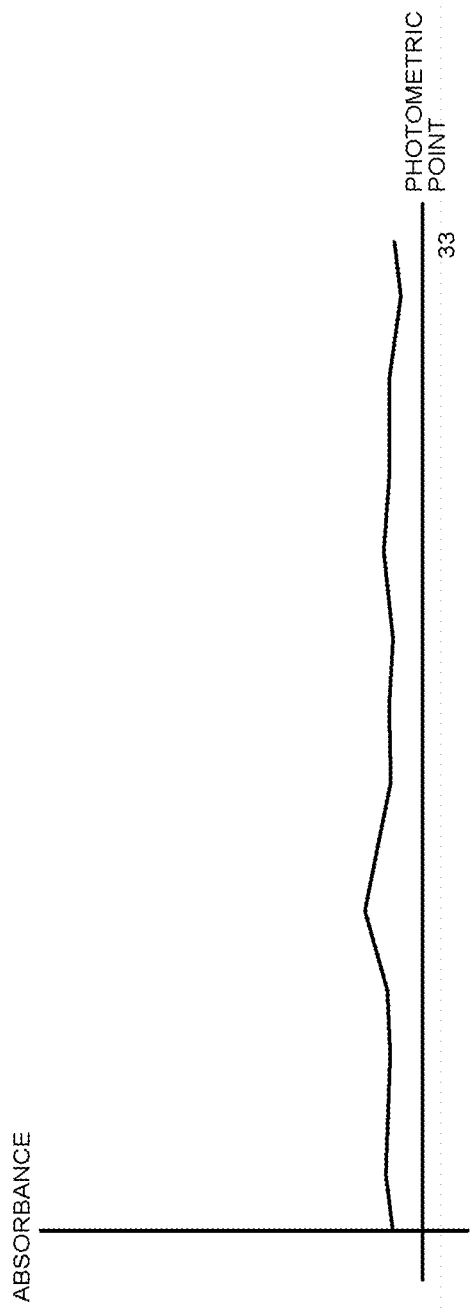

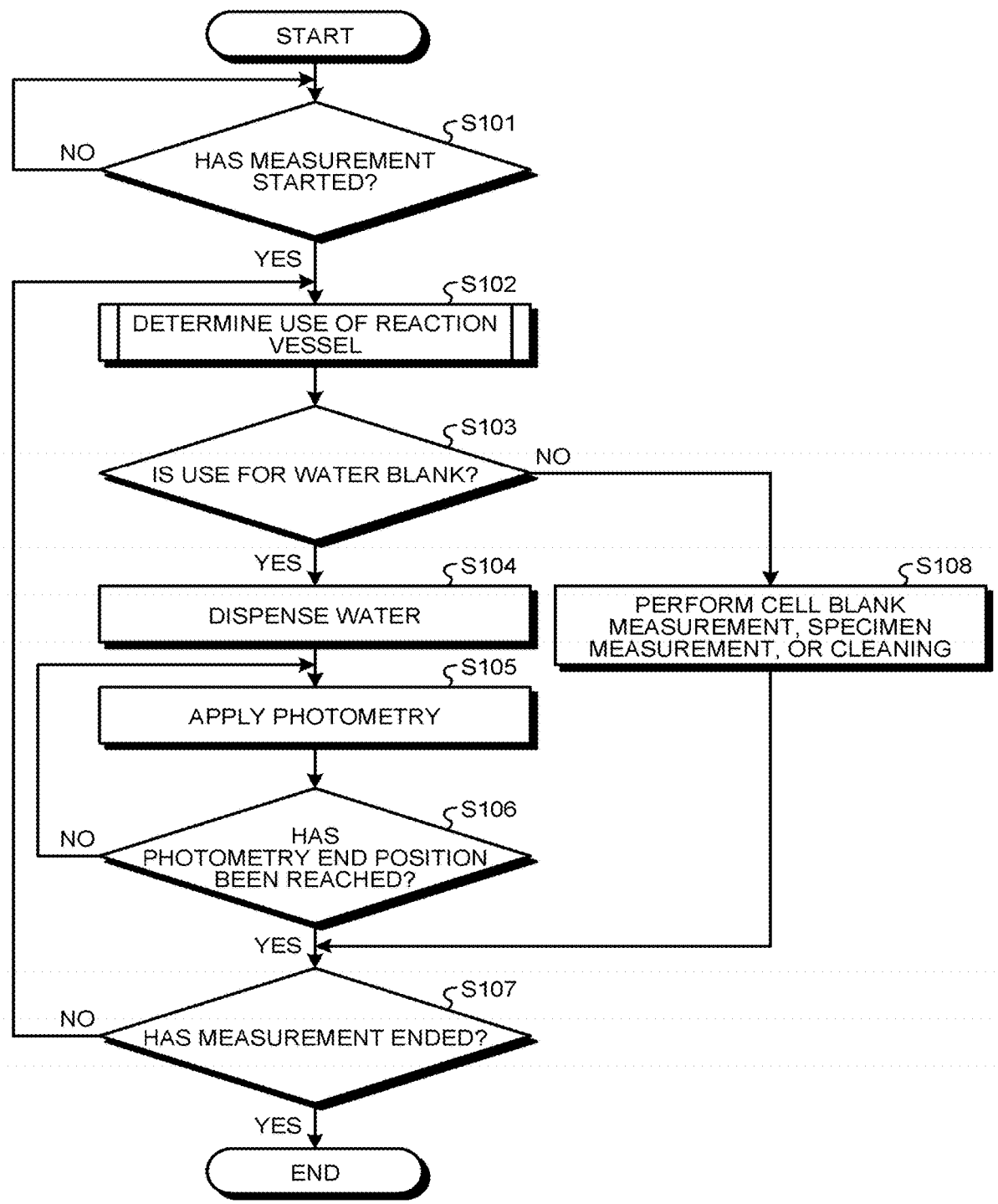

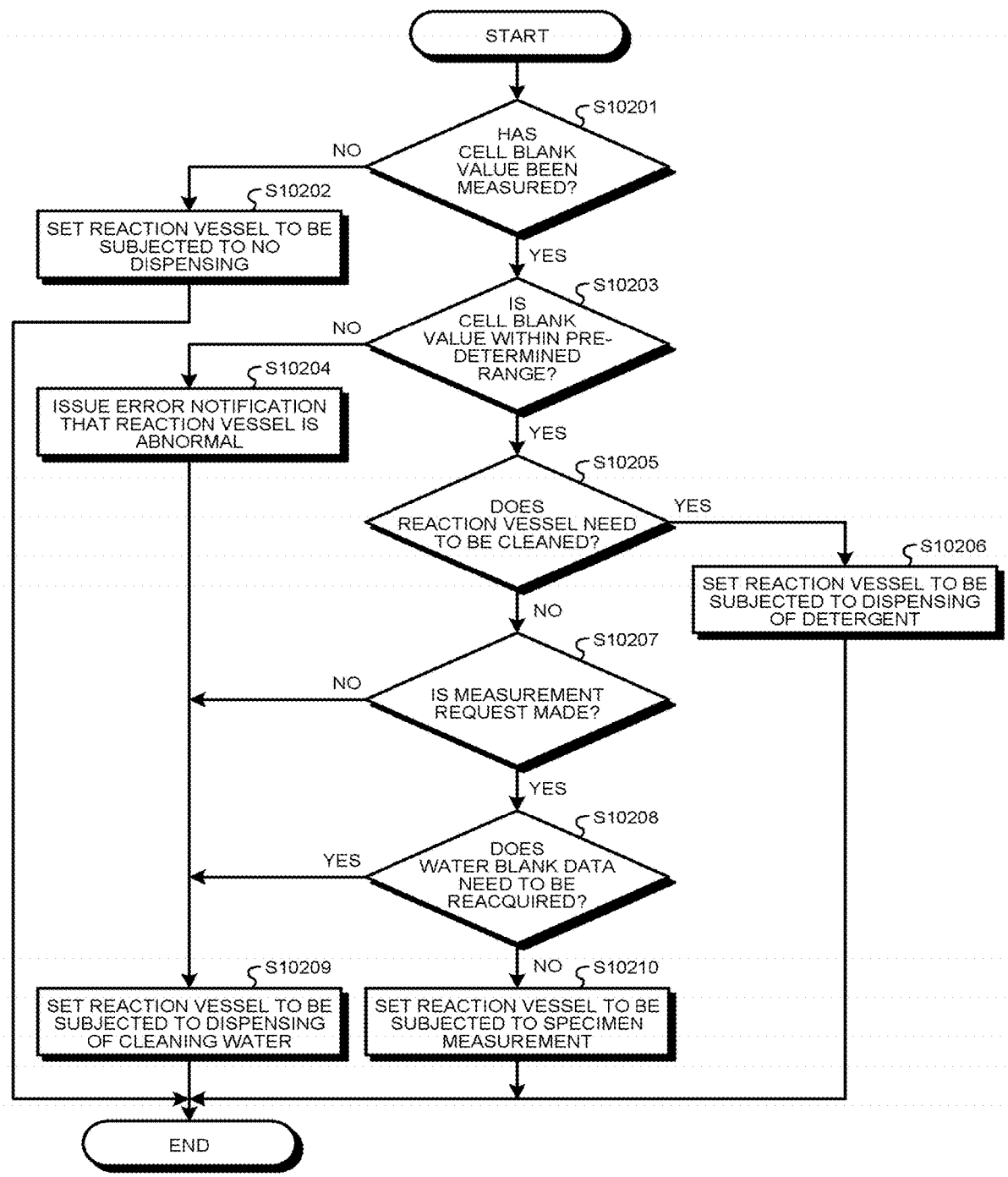

AUTOMATIC ANALYSIS APPARATUS

CROSS-REFERENCE TO RELATED APPLICATIONS

This application is based upon and claims the benefit of priority from Japanese Patent Application No. 2019-60391, filed on Mar. 27, 2019; the entire contents of which are incorporated herein by reference.

FIELD

Embodiments described herein relate generally to an automatic analysis apparatus.

BACKGROUND

Conventionally, medical institutions use an automatic analysis apparatus to automatically measure concentrations and activities of various components in a test specimen collected from a subject. For example, the automatic analysis apparatus mixes a reagent corresponding to a test item with the test specimen of, for example, blood, urine, stools, or somatic cells, and detects variations in an optical property in the mixture liquid so as to measure a concentration and activity of a target component.

To diagnose a hardware abnormality of a reaction system, the automatic analysis apparatus applies photometry to a reaction vessel with only water contained therein to collect water blank data. For example, using an instruction from a user as a trigger, the automatic analysis apparatus causes a reagent probe to discharge cleaning water to the target reaction vessel, and applies the photometry to the reaction vessel to collect the water blank data for the reaction vessel. Alternatively, for example, a particular reaction vessel of a plurality of reaction vessels is specified as a reaction vessel for water blank data collection, and the cleaning water is always dispensed to the particular reaction vessel to collect the water blank data, without using the particular reaction vessel for measuring the test specimen.

BRIEF DESCRIPTION OF THE DRAWINGS

FIG. 4 is another diagram for explaining the collection of the water blank data in the automatic analysis apparatus according to the first embodiment;

FIG. 5A is a chart illustrating an example of a holding table of the water blank data according to the first embodiment;

FIG. 5B is a chart illustrating an example of another holding table of the water blank data according to the first embodiment;

FIG. 6A is a diagram illustrating an example of a graphical representation of the water blank data according to the first embodiment;

FIG. 7 is a flowchart for explaining a procedure of processing performed by an automatic analysis apparatus according to the first embodiment; and FIG. 8 is a flowchart for explaining the procedure of the processing performed by the automatic analysis apparatus according to the first embodiment.

DETAILED DESCRIPTION

According to an embodiment, an automatic analysis apparatus includes a holder, a first dispenser, a second dispenser, a detector, a memory and processing circuitry. The holder is configured to movably hold a plurality of reaction vessels. The first dispenser is configured to dispense an analyte into each of the reaction vessels. The second dispenser is configured to dispense a reagent into the reaction vessel. The detector is configured to detect light transmitted through the reaction vessel. The memory is configured to store a test order. The processing circuitry is configured to control the holder, the first dispenser, and the second dispenser based on the test order. The processing circuitry is configured to determine one of the reaction vessels to be used for measuring the analyte based on the test order. The processing circuitry is configured to perform control to collect characteristic data from another of the reaction vessels not used for measuring the analyte while the analyte is measured.

The following describes an automatic analysis apparatus according to embodiments with reference to the accompanying drawings. The automatic analysis apparatus according to the present application is not limited to the embodiments described below. The embodiments can be combined with other embodiments and/or conventional technologies within a scope in which no contradiction occurs in the content of processing.

First Embodiment

Figure 1:
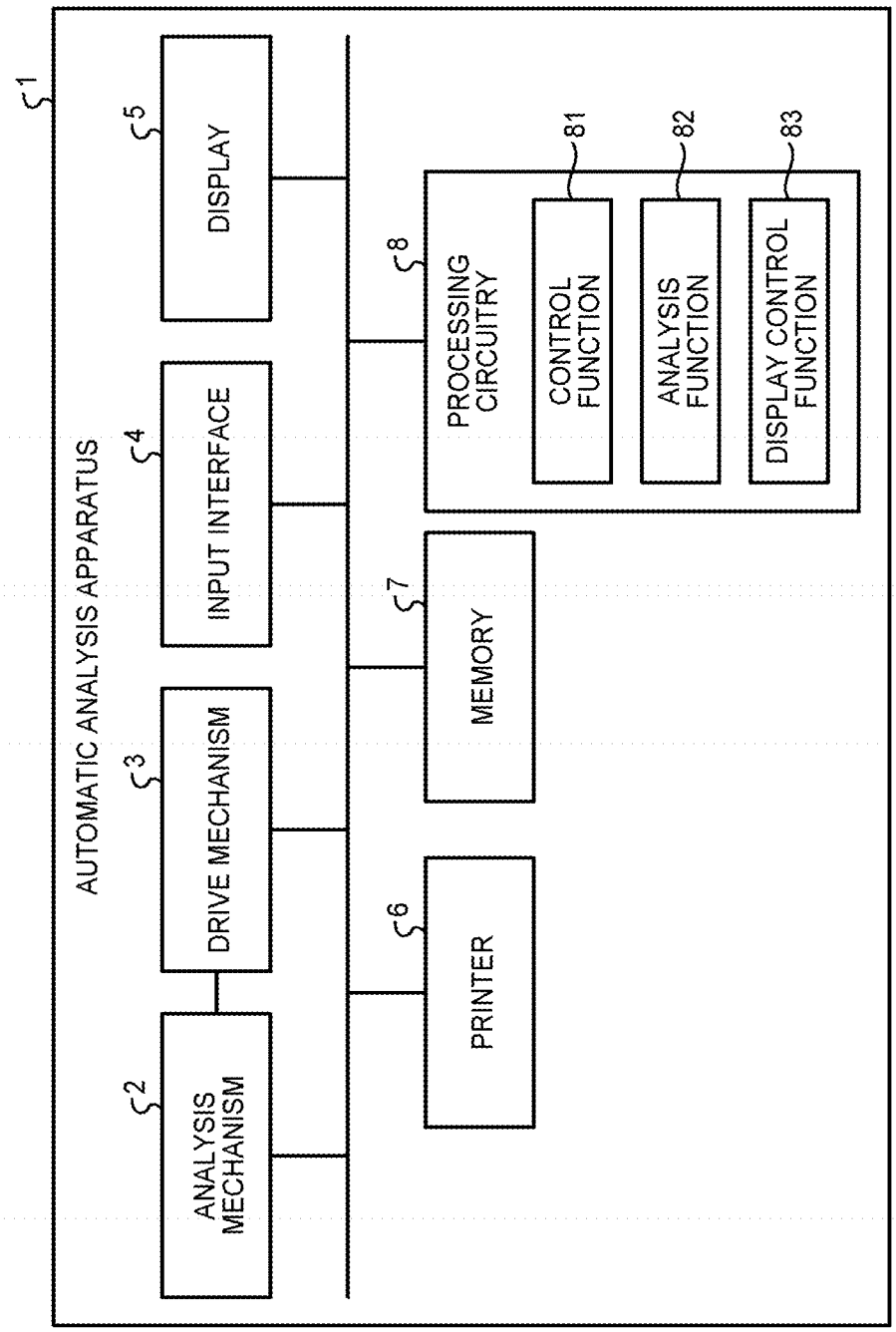
FIG. 1 is a block diagram illustrating an example of a configuration of an automatic analysis apparatus according to a first embodiment.

An example of a configuration of the automatic analysis apparatus according to a first embodiment will be described using FIG. 1. FIG. 1 is a block diagram illustrating the example of the configuration of an automatic analysis apparatus 1 according to the first embodiment. As illustrated in FIG. 1, the automatic analysis apparatus 1 according to the first embodiment includes, for example, an analysis mechanism 2, a drive mechanism 3, an input interface 4, a display 5, a printer 6, a memory 7, and processing circuitry 8. The analysis mechanism 2, the drive mechanism 3, the input interface 4, the display 5, the printer 6, the memory 7, and the processing circuitry 8 are connected so as to be capable of communicating with one another.

The analysis mechanism 2 includes various units for performing automated analysis, and is driven by the drive mechanism 3 to perform a sequence of operations for measuring a predetermined component contained in a test specimen (analyte) according to a preset cycle time. The cycle time refers to one of parameters that determine a measurement throughput (number of tests capable of measurement in a given period of time) of the automatic analysis apparatus 1.

The analysis mechanism 2 mixes the test specimen collected from a test subject with a reagent corresponding to a desired test item. The analysis mechanism 2 measures an optical property of the mixture liquid of the test specimen and the reagent, and generates test data represented by, for example, absorbance. The analysis mechanism 2 also mixes a standard specimen corresponding to a predetermined test item with a reagent corresponding to the predetermined test item. The standard specimen is, for example, a solution having a known concentration or activity of a component analyzed in the test item. The analysis mechanism 2 measures the optical property of the mixture liquid of the standard specimen and the reagent, and generates standard data represented by, for example, the absorbance. The test data and the standard data thus generated are output to the processing circuitry 8. Hereinafter, each of the test specimen and the standard specimen may be collectively referred to as "specimen" or "sample". Measuring the optical property may be referred to as "photometry".

Figure 2:
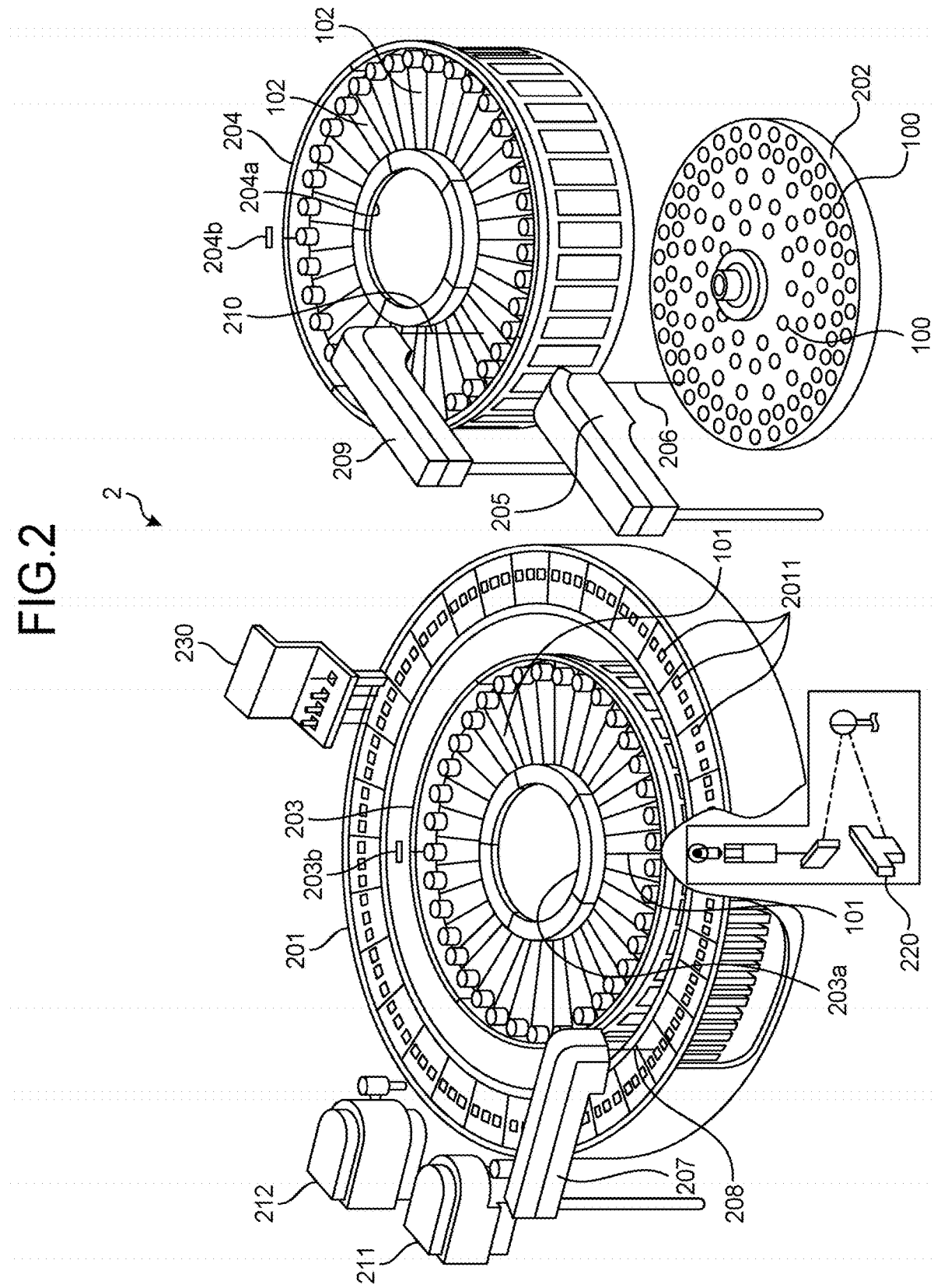
FIG. 2 is a diagram illustrating an example of a configuration of an analysis mechanism according to the first embodiment.

FIG. 2 is a diagram illustrating an example of a configuration of the analysis mechanism 2 according to the first embodiment. As illustrated in FIG. 2, the analysis mechanism 2 includes a reaction disc 201, a sample disc 202, a first reagent storage 203, a reagent container rack 203a, a reader 203b, a second reagent storage 204, a reagent container rack 204a, and a reader 204b. The analysis mechanism 2 also includes a sample dispensing arm 205, a sample dispensing probe 206, a first reagent dispensing arm 207, a first reagent dispensing probe 208, a second reagent dispensing arm 209, a second reagent dispensing probe 210, a first stirring unit 211, and a second stirring unit 212. The analysis mechanism 2 further includes a photometric unit 220 and a cleaning unit 230.

The reaction disc 201 holds a plurality of circularly-arranged reaction vessels 2011. The reaction disc 201 is driven by the drive mechanism 3 to alternately repeat rotating and stopping at predetermined intervals of time set as the cycle time. The reaction disc 201 rotates and stops in this way, so that the reaction vessels 2011 held by the reaction disc move, for example, by a predetermined angle in a predetermined direction. The reaction vessels 2011 are made of, for example, glass. The reaction disc 201 is an example of a reaction vessel moving unit.

The sample disc 202 holds a plurality of specimen containers 100 each accommodating a specimen, and is rotated by the drive mechanism 3.

The first reagent storage 203 refrigerates a reagent container 101 accommodating a first reagent that reacts with the predetermined component contained in each of the standard specimen and the test specimen. The first reagent storage 203 holds a plurality of the reagent containers 101 in a circumferential manner using the reagent container rack 203a. The reagent container rack 203a is rotated by the drive mechanism 3 about the center of the first reagent storage 203 serving as the center of the rotation. As the reagent container rack 203a rotates and stops, the reagent containers 101 rotate and stop at intervals of one cycle time with rear surfaces thereof facing outward of the first reagent storage 203. This operation moves each of the reagent containers 101 accommodating the first reagents required in the order of the test items instructed by the processing circuitry 8 to a predetermined position, for example, to a position where the reagent is suctioned.

The reagent containers 101 held by the reagent container rack 203a accommodate, for example, the first reagents used in basic test items. The basic test items refer herein to, for example, test items requested for substantially all the specimens, and are frequently requested test items. For example, the basic test items include test items commonly requested for all examinees of, for example, a health examination. To take an example, the basic test items include tests for, for example, glutamate oxaloacetate transaminase (GOT), glutamate pyruvate transaminase (GPT), high-density lipoprotein (HDL), low-density lipoprotein (LDH), and creatinine (Cre).

The basic test items are set in advance. In that case, for example, a basic test item list indicating which test items are the basic test items is stored in advance in the memory 7. The basic test item list includes, for example, character strings representing names of test items serving as the basic test items. The test items included in the basic test item list may be set by an operator through the input interface 4.

The reagent container 101 is provided with a recording medium that records, for example, identification information on the reagent accommodated in the reagent container 101. The identification information on the reagent includes, for example, a reagent name, a test item name corresponding to the reagent, a lot number, a type of a reagent container, and an expiration date of the reagent. The recording medium is, for example, an optically readable optical mark or a radio frequency identification (RFID) tag readable through wireless communication. The optical mark is a mark, such as a barcode, a one-dimensional pixel code, or a two-dimensional pixel code, generated by encoding, for example, the identification information on the reagent accommodated in the reagent container 101.

The reader 203b is provided near the outside of the first reagent storage 203 so as to be capable of reading the optical mark attached to the rear surface of the reagent container 101 held by the reagent container rack 203a through a detection window provided on an outer wall of the first reagent storage 203.

For example, at a time when the reagent container rack 203a is loaded with the reagent container 101, the reader 203b uses an instruction to start reading from the processing circuitry 8 as a trigger to read the optical mark attached to the reagent containers 101. The reader 203b supplies the identification information on the reagent written on the read optical mark to the processing circuitry 8.

The second reagent storage 204 refrigerates, for example, a reagent container 102 accommodating a second reagent forming a pair with the first reagent as a two-reagent system. The second reagent storage 204 holds a plurality of the reagent containers 102 in a circumferential manner using the reagent container rack 204a. The reagent container rack 204a is rotated by the drive mechanism 3 about the center of the second reagent storage 204 serving as the center of the rotation. As the reagent container rack 204a rotates and stops, the reagent containers 102 rotate and stop at intervals of one cycle time with rear surfaces thereof facing outward of the second reagent storage 204, in the same way as the reagent containers 101. This operation moves each of the reagent containers 102 accommodating the second reagents required in the order of the test items instructed by the processing circuitry 8 to a predetermined position, for example, to a position where the reagent is suctioned.

The reagent containers 102 held by the reagent container rack 204a include those that accommodate, for example, the second reagents used in basic test items.

The reagent container 102 is provided with the recording medium that records, for example, the identification information on the reagent accommodated in the reagent container 102. The recording medium is, for example, the optically readable optical mark or the RFID tag readable through the wireless communication.

The reader 204b is provided near the outside of the second reagent storage 204 so as to be capable of reading the optical mark attached to the rear surface of the reagent container 102 held by the reagent container rack 204a through a detection window provided on an outer wall of the second reagent storage 204.

For example, at a time when the reagent container rack 204a is loaded with the reagent container 102, the reader 204b uses an instruction to start reading from the processing circuitry 8 as a trigger to read the optical mark attached to the reagent containers 102. The reader 204b supplies the identification information on the reagent written on the read optical mark to the processing circuitry 8.

The sample dispensing arm 205 is provided between the reaction disc 201 and the sample disc 202 so as to be movable upward and downward in the vertical direction and rotatable in the horizontal direction. The sample dispensing arm 205 holds, at one end thereof, the sample dispensing probe 206. The sample dispensing arm 205 is moved up and down and rotated by the drive mechanism 3. The sample dispensing probe 206 rotates along a circular-arc-shaped rotational trajectory as the sample dispensing arm 205 rotates. On this rotational trajectory, a sample suction position is set in which the sample dispensing probe 206 suctions the specimen from one of the specimen containers 100. In a position that differs from the sample suction position on the rotational trajectory and is located on a rotational trajectory of the reaction vessels 2011, a sample discharge position is set in which the sample dispensing probe 206 discharges the suctioned specimen to one of the reaction vessels 2011.

The sample dispensing probe 206 is driven by the drive mechanism 3 to move in the up-down direction in the sample suction position and the sample discharge position. According to the control of the processing circuitry 8, the sample dispensing probe 206 suctions the specimen from one of the specimen containers 100 located in the sample suction position. According to the control of the processing circuitry 8, the sample dispensing probe 206 discharges the suctioned specimen to one of the reaction vessels 2011 located in the sample discharge position. The sample dispensing probe 206 can also discharge cleaning water to the reaction vessel 2011 located in the sample discharge position. The cleaning water refers herein to water for cleaning the inner surface of the sample dispensing probe 206. The sample dispensing probe 206 is an example of a first dispensing unit.

The first reagent dispensing arm 207 is provided near the outer circumference of the reaction disc 201 so as to be movable upward and downward in the vertical direction and rotatable in the horizontal direction. The first reagent dispensing arm 207 holds, at one end thereof, the first reagent dispensing probe 208. The first reagent dispensing arm 207 is moved up and down and rotated by the drive mechanism 3. The first reagent dispensing probe 208 rotates along a circular-arc-shaped rotational trajectory as the first reagent dispensing arm 207 rotates.

On this rotational trajectory, a first reagent suction position is set in which the first reagent dispensing probe 208 suctions the first reagent corresponding to each of the test items from a corresponding one of the reagent containers 101 arranged in the first reagent storage 203, and a first reagent discharge position is set in which the first reagent dispensing probe 208 discharges the suctioned first reagent to one of the reaction vessels 2011. The rotational trajectory of the first reagent dispensing probe 208 intersects a rotational trajectory of the reagent containers 101 held by the reagent container rack 203a in the first reagent storage 203 and the rotational trajectory of the reaction vessels 2011 held by the reaction disc 201. The points of intersection with the respective rotational trajectories serve as the first reagent suction position and the first reagent discharge position.

The first reagent dispensing probe 208 is driven by the drive mechanism 3 to move in the up-down direction in the first reagent suction position and the first reagent discharge position on the rotational trajectory of the first reagent dispensing probe 208. According to the control of the processing circuitry 8, the first reagent dispensing probe 208 suctions the first reagent from the reagent container 101 located in the first reagent suction position. According to the control of the processing circuitry 8, the first reagent dispensing probe 208 discharges the suctioned first reagent to the reaction vessel 2011 located in the first reagent discharge position. The first reagent dispensing probe 208 can also discharge cleaning water to the reaction vessel 2011 located in the first reagent discharge position. The cleaning water refers herein to water for cleaning the inner surface of the first reagent dispensing probe 208.

The second reagent dispensing arm 209 is provided between the reaction disc 201 and the second reagent storage 204 so as to be movable upward and downward in the vertical direction and rotatable in the horizontal direction. The second reagent dispensing arm 209 holds, at one end thereof, the second reagent dispensing probe 210. The second reagent dispensing arm 209 is moved up and down and rotated by the drive mechanism 3. The second reagent dispensing probe 210 rotates along a circular-arc-shaped rotational trajectory as the second reagent dispensing arm 209 rotates.

On this rotational trajectory, a second reagent suction position is set in which the second reagent dispensing probe 210 suctions the second reagent corresponding to each of the test items from a corresponding one of the reagent containers 102 held by the reagent container rack 204a arranged in the second reagent storage 204, and a second reagent discharge position is set in which the second reagent dispensing probe 210 discharges the suctioned second reagent to one of the reaction vessels 2011. The rotational trajectory of the second reagent dispensing probe 210 intersects a rotational trajectory of the reagent containers 102 held by the reagent container rack 204a in the second reagent storage 204 and the rotational trajectory of the reaction vessels 2011 held by the reaction disc 201. The points of intersection with the respective rotational trajectories serve as the second reagent suction position and the second reagent discharge position.

The second reagent dispensing probe 210 is driven by the drive mechanism 3 to move in the up-down direction in the second reagent suction position and the second reagent discharge position on the rotational trajectory of the second reagent dispensing probe 210. According to the control of the processing circuitry 8, the second reagent dispensing probe 210 suctions the second reagent from the reagent container 102 located in the second reagent suction position. According to the control of the processing circuitry 8, the second reagent dispensing probe 210 discharges the suctioned second reagent to the reaction vessel 2011 located in the second reagent discharge position. The second reagent dispensing probe 210 can also discharge cleaning water to the reaction vessel 2011 located in the second reagent discharge position. The cleaning water refers herein to water for cleaning the inner surface of the second reagent dispensing probe 210. The first reagent dispensing probe 208 and the second reagent dispensing probe 210 are each an example of a second dispensing unit.

The first stirring unit 211 and the second stirring unit 212 are provided near the outer circumference of the reaction disc 201. The first stirring unit 211 includes a first stirring arm and a first stirring bar provided at a distal end of the first stirring arm. The first stirring unit 211 uses the first stirring bar to stir the specimen and the first reagent accommodated in the reaction vessel 2011 disposed in a first stirring position on the reaction disc 201.

The second stirring unit 212 includes a second stirring arm, and further includes a second stirring bar provided at a distal end of the second stirring arm. The second stirring unit 212 uses the second stirring bar to stir the specimen, the first reagent, and the second reagent accommodated in the reaction vessel 2011 disposed in a second stirring position on the reaction disc 201.

The photometric unit 220 is provided near a photometric position. The photometric position is set in advance on the reaction disc 201. The photometric unit 220 optically measures the component in, for example, the mixture liquid accommodated in each of the reaction vessels 2011. The photometric unit 220 includes a light source and a photodetector. The light source and the photodetector are provided in positions facing each other on opposite sides of one of the reaction vessels 2011 located in the photometric position.

According to the control of the processing circuitry 8, the photometric unit 220 emits light from the light source. The photodetector detects the light emitted from the light source at a sampling period synchronized with the cycle time. This operation detects the light transmitted through the mixture liquid discharged to the reaction vessel 2011. The photodetector generates the standard data or the test data represented by, for example, the absorbance based on an intensity of the detected light. The photometric unit 220 outputs the generated standard data or test data to the processing circuitry 8. The photometric unit 220 is an example of a detection unit.

The cleaning unit 230 includes a waste liquid nozzle, a cleaning nozzle, and a drying nozzle. The cleaning unit 230 uses the waste liquid nozzle to suction the mixture liquid in the reaction vessel 2011 located in a reaction vessel cleaning position as a waste liquid. The cleaning unit 230 uses the cleaning nozzle to discharge a cleaning liquid to the reaction vessel 2011 located in the reaction vessel cleaning position to clean the reaction vessel 2011. The cleaning unit 230 uses the drying nozzle to supply dry air to the reaction vessel 2011 to dry the reaction vessel 2011 cleaned with the cleaning liquid.

Referring back to FIG. 1, the drive mechanism 3 is implemented using, for example, a gear, a stepper motor, a conveyor belt, and a lead screw. The drive mechanism 3 drives the analysis mechanism 2 based on the control of the processing circuitry 8.

The input interface 4 is connected to the processing circuitry 8, and converts an input operation received from a user into an electrical signal to output it to the processing circuitry 8. The input interface 4 is implemented using, for example, a trackball, switch buttons, a mouse, a keyboard, a touchpad having an operation surface to be touched to receive the input operation, a touchscreen obtained by integrating a display screen with the touchpad, a noncontact input circuit using an optical sensor, and a voice input circuit. The input interface 4 is not limited to those including physical operation components, such as the mouse and the keyboard. Examples of the input interface 4 also include an electrical signal processing circuit that receives an electrical signal corresponding to the input operation from an external input device provided separately from the automatic analysis apparatus 1, and outputs the electrical signal to the processing circuitry 8. For example, the input interface 4 receives setting of, for example, analytical parameters for each of the test items on the specimen.

The display 5 displays a graphical user interface (GUI) for the operator to use the input interface 4 to enter various setting requests, and displays analytical data representing results of the analysis performed by the automatic analysis apparatus 1. For example, the display 5 is implemented using, for example, a liquid crystal monitor, a cathode-ray tube (CRT) monitor, or a touchscreen.

The printer 6 prints, for example, the analytical data supplied from the processing circuitry 8 on, for example, a printer paper sheet according to a preset format.

The memory 7 stores therein various computer programs for performing the automated analysis and information used by the computer programs. The memory 7 stores therein a test order and results of processing performed by the processing circuitry 8. For example, the memory 7 stores therein water blank data for each of the reaction vessels 2011 and the analytical data representing the results of the analysis performed by the automatic analysis apparatus 1. For example, the memory 7 is implemented using, for example, a random-access memory (RAM), a semiconductor memory device such as a flash memory, a hard disk, or an optical disc. The memory 7 is an example of a storage unit.

The processing circuitry 8 controls overall processing of the automatic analysis apparatus 1. For example, the processing circuitry 8 reads a control function 81, an analysis function 82, and a display control function 83 from the memory 7, and executes them to cause the automatic analysis apparatus 1 to collect the test data, acquire the analytical data based on the test data, and display the analytical data. For example, the processing circuitry is implemented using a processor. The control function 81 is an example of a control unit. The display control function 83 is an example of a display control unit.

In the present embodiment, the following describes that the single processing circuitry 8 performs each of the processing functions described below. However, a plurality of independent processors may be combined to constitute the processing circuitry, and the processors may execute the computer programs to perform the respective functions.

The control function 81 controls components included in the automatic analysis apparatus 1 in response to the input operation received from the operator through the input interface 4. For example, the control function 81 controls the drive mechanism 3 to control the driving of the components in the analysis mechanism 2. The control function 81 controls the photometric unit 220 to control the emission of the light from the light source and the generation of the standard data and the test data by the photodetector. The control function 81 controls the cleaning unit 230 to control the cleaning of the reaction vessel.

For example, based on the test order, the control function 81 controls the units of the analysis mechanism 2 to generate the standard data and the test data. The standard data and the test data generated by the control function 81 are output to the analysis function 82 to generate the analytical data. The control function 81 performs the control so as to generate cell blank data used when the analytical data is generated. The cell blank data refers herein to data for correcting variations among the reaction vessels 2011, and is generated by applying the photometry to a reaction vessel with water dispensed thereto.

For example, the control function 81 performs control to clean each of the reaction vessels 2011 used for generating the standard data and the test data, and then dispense the water into the cleaned reaction vessel 2011 to generate the cell blank data. To take an example, the control function 81 controls the cleaning unit 230 to suction, as the waste liquid, the mixture liquid in the reaction vessel 2011 located in the reaction vessel cleaning position, and discharge the cleaning liquid to the reaction vessel 2011 located in the reaction vessel cleaning position to clean the reaction vessel 2011. Then, the control function 81 causes the cleaned reaction vessel 2011 to discharge the cleaning water, and causes the photometric unit 220 to generate the cell blank data.

The control function 81 stores the generated cell blank data in the memory 7 so as to be associated with an identifier (ID) of the reaction vessel 2011. The cell blank data stored in the memory 7 is used when the analytical data is generated from the standard data and the test data generated by the photometry performed using corresponding ones of the reaction vessels 2011.

The control function 81 according to the present embodiment controls generation of the water blank data for each of the reaction vessels 2011. Details of the generation of the water blank data by the control function 81 will be described later. The cell blank data described above is also used in the generation of the water blank data.

The analysis function 82 uses the cell blank data, the standard data, and the test data to generate the analytical data. For example, the analysis function 82 first subtracts the cell blank data from the standard data and the test data generated using corresponding ones of the reaction vessels 2011. In other words, the analysis function 82 reads the cell blank data stored so as to be associated with the ID of the reaction vessel 2011 used for generating the standard data, and subtracts the read cell blank data from the standard data. In the same way, the analysis function 82 reads the cell blank data stored so as to be associated with the ID of the reaction vessel 2011 used for generating the test data, and subtracts the read cell blank data from the test data. These operations can eliminate errors in the photometric values caused by the variations among the reaction vessels 2011.

The analysis function 82 generates a calibration curve corresponding to each of the test items based on the standard data. The calibration curve refers herein to a graph representing a relation between the concentration or activity of the component analyzed in the test item and the optical property such as the absorbance. For example, the analysis function 82 plots the absorbance corresponding to each of a plurality of the concentrations, and generates the calibration curve based on, for example, a least-square method. The analysis function 82 fits the absorbance according to the test data to the generated calibration curve so as to generate the analytical data representing the concentration or activity of the component corresponding to the absorbance. The analysis function 82 stores the generated analytical data in the memory 7.

The display control function 83 displays the results of processing by the control function 81 and the analysis function 82 on the display 5. For example, the display control function 83 displays the analytical data generated by the analysis function 82 and the information on the water blank data generated by the control function 81 on the display 5.

The above has described the overall configuration of the automatic analysis apparatus 1 according to the first embodiment. Under the above-described configuration, the automatic analysis apparatus 1 can automatically collect the characteristic data for each of the reaction vessels without affecting the measurement processing. For example, the automatic analysis apparatus 1 can automatically collect the water blank data for all the reaction vessels without affecting the measurement processing. In that case, while the measurement processing is performed, the automatic analysis apparatus 1 collects the water blank data from any one of the reaction vessels 2011 not used for the measurement of the test specimen, and thus can automatically collect the water blank data for all the reaction vessels without affecting the measurement processing.

As described above, using the instruction from the user as the trigger, the cleaning water is discharged to a target reaction vessel, and the photometry is applied to the reaction vessel, so that the water blank data for the reaction vessel can be collected. In this case, however, the user needs to instruct the collection of the water blank data, so that the user bears a great burden to collect the water blank data for all the reaction vessels. In addition, in this case, the target reaction vessel cannot be used for the measurement, resulting in a great reduction in measurement processing performance.

If a particular reaction vessel of the reaction vessels is specified as a reaction vessel for the water blank data collection, only the water blank data for the particular reaction vessel can be collected, so that a case cannot be dealt with where a problem occurs in a reaction vessel other than the particular reaction vessel. The measurement processing performance decreases as the number of the reaction vessels specified as reaction vessels for the water blank data collection increases.

Therefore, while the measurement processing is performed, the automatic analysis apparatus 1 according to the present embodiment dispenses the water into any one of the reaction vessels 2011 with no specimen dispensed thereto, and applies the photometry to the reaction vessel 2011 so as to automatically collect the water blank data for the reaction vessel 2011.

Specifically, the control function 81 performs control so as to use the reaction vessel 2011 for measuring the specimen based on the test order, or to collect the water blank data by dispensing the water into the reaction vessel 2011. In this control, based on the test order, the control function 81 determines to use the reaction vessel 2011 for measuring the specimen, and then, based on the status of use of the reaction vessel 2011 or the result of measurement of the specimen using the reaction vessel 2011, and on the water blank data, determines again whether to use the reaction vessel 2011 for measuring the specimen. The control function 81 performs control so as to use the reaction vessel 2011 for measuring the specimen if the reaction vessel 2011 is determined again to be used for the measurement, or otherwise, to collect the water blank data by dispensing the water into the reaction vessel 2011 not used for measuring the specimen.

In other words, when the measurement has started, the control function 81 determines whether each of the reaction vessels 2011 held by the reaction disc 201 satisfies a predetermined condition so as to determine whether to dispense the specimen thereto. The control function 81 causes the water to be dispensed into the reaction vessel 2011 to which the specimen is not to be dispensed so as to collect the water blank data. In this collection operation, the control function 81 performs control to apply the photometry to the reaction vessel 2011 with the water dispensed thereto each time the reaction vessel 2011 passes through the photometric unit 220 until the reaction vessel 2011 reaches the cleaning unit 230. In other words, the control function 81 performs control to rotate the reaction disc 201 by a fixed amount to move the reaction vessel 2011 at intervals of one cycle time and apply the photometry each time the reaction vessel 2011 passes through the photometric unit 220 so as to collect a plurality of pieces of the water blank data from one reaction vessel 2011.

The following describes examples of the predetermined condition used for determining whether to dispense the specimen. For example, the control function 81 performs control to collect the water blank data from any one of the reaction vessels 2011 from which no water blank data has been collected for a predetermined period, instead of using the reaction vessel 2011 for measuring the specimen. In other words, the control function 81 calculates an elapsed period from a previous collection time of the water blank data for the reaction vessel 2011, and if the calculated elapsed period exceeds a predetermined threshold, determines to collect the water blank data therefrom, instead of using the reaction vessel 2011 for measuring the specimen. In other words, the control function 81 does not collect the water blank data until the predetermined elapsed period elapses from the previous collection time of the water blank data. The threshold for the elapsed period can be set to any period, and is set to, for example, four to five hours.

For example, the control function 81 determines whether the collected water blank data is normal or abnormal, and performs control to collect the water blank data from the reaction vessel 2011 determined to be abnormal, instead of using the reaction vessel 2011 for measuring the specimen. As described above, the control function 81 collects a plurality of pieces of the water blank data from one reaction vessel 2011. Accordingly, the control function 81 determines, as the normal/abnormal determination of the water blank data, for example, whether a variation in the water blank data from the reaction vessel 2011 exceeds a separately specified threshold, and if the variation in the water blank data from the reaction vessel 2011 exceeds a separately specified threshold, re-collects the water blank data, instead of using the photometric unit 220 for the measurement.

To take an example, the control function 81 calculates a coefficient of variation (CV) of the pieces of the water blank data, and if the calculated coefficient of variation exceeds a predetermined range, re-collects the water blank data, instead of using the photometric unit 220 for the measurement. The predetermined range can be set to any range. The indicator for determining the variation of the data is not limited to the coefficient of variation described above. Any indicator allowing the determination of the variation of the data may be used. As a result, the potentially abnormal reaction vessel 2011 can be avoided from being used for measuring the specimen, and the water blank data can be re-collected.

For example, the control function 81 determines, based on the collected water blank data, whether the cell blank data has been successfully collected, and performs control to collect the water blank data from the reaction vessel 2011 from which the cell blank data has failed to be collected, instead of using the reaction vessel 2011 for measuring the specimen. As described above, the automatic analysis apparatus 1 collects the cell blank data serving as a reference of calculation of the standard data and the test data. The cell blank data is also used for calculating the water blank data. In other words, the control function 81 calculates the water blank data by subtracting the cell blank data from the photometric values obtained by applying the photometry to the reaction vessel 2011 with the water dispensed thereto.

In this calculation, the control function 81 subtracts the cell blank data from the respective photometric values obtained from the reaction vessel 2011 with the water dispensed thereto so as to collect a plurality of pieces of the water blank data. As described above, the control function 81 determines the accuracy of the cell blank data based on the plurality of pieces of the collected water blank data so as to determine whether the cell blank data has been successfully collected. For example, if unnatural offsets are present in the pieces of the water blank data (for example, if all pieces of the collected water blank data are greatly offset to negative values), the control function 81 determines that the cell blank data has failed to be collected.

The control function 81 performs control to collect the water blank data from the reaction vessel 2011 from which the cell blank data has failed to be collected, instead of using the reaction vessel 2011 for measuring the specimen. As a result, the potentially abnormal reaction vessel 2011 can be avoided from being used for measuring the specimen.

For example, the control function 81 performs control to collect the water blank data from the reaction vessel 2011 in which the specimen has been measured more times than a predetermined number of times after the water blank data was collected, instead of using the reaction vessel 2011 for measuring the specimen. In other words, the control function 81 calculates the number of times of measurement of the specimen performed after the previous collection of the water blank data from the reaction vessel 2011, and if the calculated number of times of measurement exceeds a predetermined threshold, determines to collect the water blank data, instead of using the reaction vessel 2011 for measuring the specimen. The threshold for the number of times of measurement can be set to any number. This calculation can determine, for example, accumulation of contamination in the reaction vessel 2011.

For example, the control function 81 performs control to collect the water blank data from the reaction vessel 2011 with a predetermined reagent dispensed thereto, instead of using the reaction vessel 2011 for measuring the specimen. To take an example, if a reagent (for example, a highly viscous reagent) that can contaminate the reaction vessel 2011 has been used at previous measurement, the control function 81 collects the water blank data before using the reaction vessel 2011 for measuring the specimen. In other words, the control function 81 collects the water blank data before using the reaction vessel 2011 for measuring the specimen so as to be capable of determining whether the contamination is attached to the reaction vessel 2011, and capable of measuring the specimen using the reaction vessel 2011 after being confirmed to be free of attached contamination. Any reagent can be set as the reagent that necessitates the collection of the water blank data instead of using the reaction vessel 2011 for measuring the specimen.

In the above-described example, the case has been described where the water blank data is collected from the reaction vessel 2011 with the predetermined reagent dispensed thereto, instead of using the reaction vessel 2011 for measuring the specimen. The embodiment is, however, not limited to this case, and may include a case where the water blank data is collected instead of measuring the specimen if a previously performed test item is a predetermined item. In other words, since each of the test items uses a fixed type of reagent, the collection of the water blank data can be controlled based on the test item.

In that case, the control function 81 identifies the previously performed measurement test item based on the test order, and if the identified test item is the predetermined item, collects the water blank data instead of measuring the specimen.

The control function 81 determines whether the result of the measurement of the specimen is abnormal, and performs control to collect the water blank data from the reaction vessel 2011 for which the result of the measurement of the specimen therein is determined to be abnormal, instead of using the reaction vessel 2011 for measuring the specimen. In other words, if the test data of the previously measured specimen is abnormal, the control function 81 collects the water blank data for determining whether the abnormal value has been obtained while equipment is normally operating, or the abnormal value of the test data has been obtained due to an abnormality of the equipment.

For example, if the re-collected water blank data has a normal value, the control function 81 can determine that the abnormal value has been obtained while the equipment is normally operating. If, instead, the re-collected water blank data has the abnormal value, the control function 81 can determine that the equipment may be abnormal.

For example, the control function 81 performs control to collect the water blank data from the reaction vessel 2011 for which the cell blank data collected therefrom exceeds a predetermined range, instead of using the reaction vessel 2011 for measuring the specimen. In other words, the control function 81 collects the water blank data if the cell blank data is determined to be abnormal, and the user checks the value of the water blank data so as to be capable of determining whether the reaction vessel 2011 itself has a problem, or the value of the collected cell blank data happens to be abnormal. The predetermined range applied to the cell blank data can be set to any range.

As described above, when the measurement has started, the control function 81 performs the determination on each of the reaction vessels 2011 held by the reaction disc 201 based on any one of the above-described conditions so as to determine whether to dispense the specimen to the reaction vessel 2011, and causes the water to be dispensed into the reaction vessel 2011 to which the specimen is not to be dispensed so as to collect the water blank data. The reaction vessel 2011 not satisfying the one of the above-described conditions is used for measuring the specimen.

Figure 3:
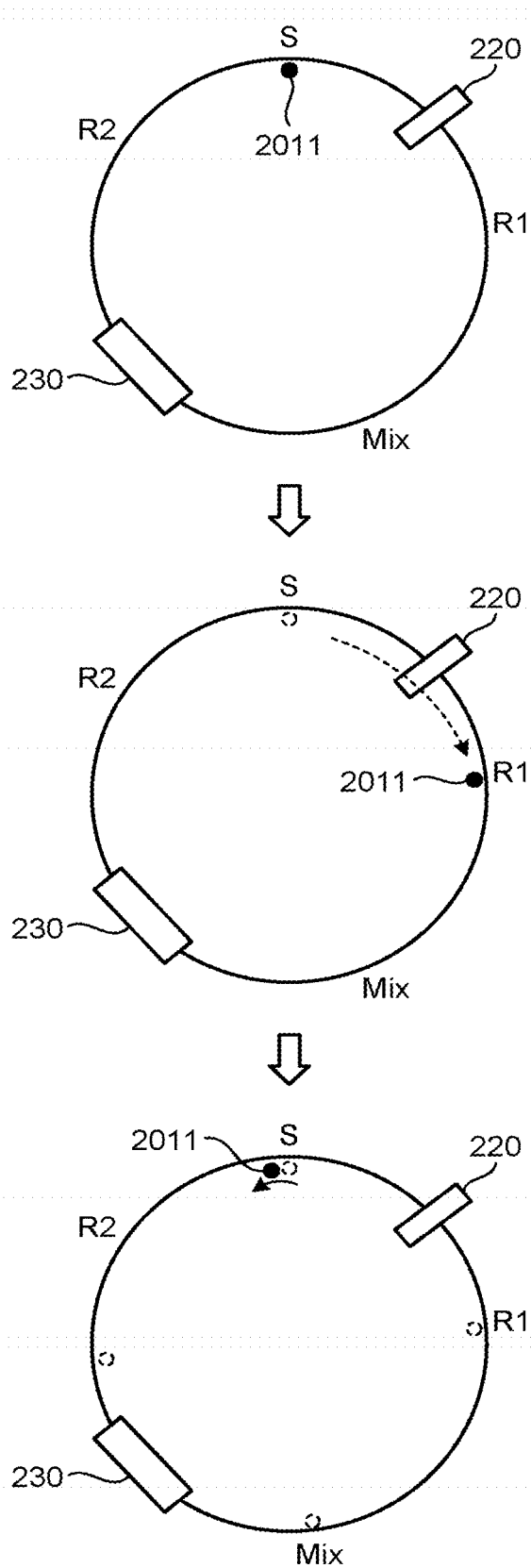
FIG. 3 is a diagram for explaining collection of water blank data in the automatic analysis apparatus according to the first embodiment.

The following describes an example of the water blank data collection in the automatic analysis apparatus 1 according to the first embodiment, using FIGS. 3 and 4. FIGS. 3 and 4 are diagrams for explaining the collection of the water blank data in the automatic analysis apparatus 1 according to the first embodiment. FIGS. 3 and 4 illustrate schematic diagrams of the reaction disc 201 when viewed from a top surface thereof. In FIG. 3, "S" represents the sample discharge position on the reaction disc 201; "R1" represents the first reagent discharge position thereon; "R2" represents the second reagent discharge position thereon; and "MIX" represents the stirring positions thereon.

The following describes an example of the automatic analysis apparatus 1 in which 165 of the reaction vessels 2011 are held on the reaction disc 201, and are moved clockwise (CW) by an amount of 41 reaction vessels at intervals of a cycle time of 4.5 seconds. In the case of the automatic analysis apparatus 1 described above, for example, as illustrated in an upper diagram of FIG. 3, the control function 81 performs the determination on one of the reaction vessels 2011 located in the sample discharge position based on any one of the above-described conditions. In other words, the control function 81 determines whether to discharge the specimen into the reaction vessel 2011 present in the sample discharge position. If the specimen is determined to be discharged, the control function 81 causes the specimen to be discharged into the reaction vessel 2011 present in the sample discharge position.

If, instead, the water is determined to be discharged to collect the water blank data, the control function 81 does not cause the specimen to be discharged into the reaction vessel 2011 present in the sample discharge position, and causes the reaction vessel 2011 to be moved clockwise by the amount of 41 reaction vessels so as to be moved to the first reagent discharge position, as illustrated in a middle diagram of FIG. 3. The control function 81 causes the cleaning water for the first reagent dispensing probe 208 to be discharged into the reaction vessel 2011 disposed in the first reagent discharge position.

Then, as illustrated in a lower diagram of FIG. 3, the control function 81 causes the reaction vessel 2011 to be moved clockwise by the amount of 41 reaction vessels at intervals of the cycle time. After the reaction vessel 2011 is moved clockwise by the amount of 41 reaction vessels for each cycle in this way, the position of the reaction vessel 2011 after four cycle times is disposed in a position offset counterclockwise (CCW) by an amount of one reaction vessel from the sample discharge position, as illustrated in the lower diagram of FIG. 3. Accordingly, in the automatic analysis apparatus 1 illustrated in FIG. 3, the reaction vessel 2011 is disposed in the position offset counterclockwise by the amount of one reaction vessel each time four cycles elapse, and returns to the original sample discharge position after 166 cycles have elapsed from when the movement has started.

In the automatic analysis apparatus 1, the photometric unit 220 measures the absorbance after the first reagent has reacted for a predetermined time after being discharged in the first reagent discharge position. Accordingly, the reaction vessel 2011 moves on the reaction disc 201 by an amount of the reaction time. In other words, the reaction vessel 2011 rotates and passes through the photometric unit 220 a plurality of times. For example, if the cycle time is 4.5 seconds, and the reaction time is 10 minutes (600 seconds), the reaction vessel 2011 passes through the photometric unit 220 each time the four cycles elapse. Therefore, the reaction vessel 2011 passes through the photometric unit 220 33 times (600/18 (=4.5×4)=33.333).

Hence, the control function 81 can collect the water blank data 33 times by performing control to apply the photometry each time the reaction vessel 2011 with the cleaning water dispensed thereto passes through the photometric unit 220. Then, before the reaction vessel 2011 makes a full turn to return to the sample discharge position, the control function 81 causes the reaction vessel 2011 after being subjected to the measurement to be cleaned by the cleaning unit 230, and collects the cell blank data from the reaction vessel 2011.

In the above-described embodiment, the case has been described where the cleaning water for the first reagent dispensing probe 208 is used as the water for collecting the water blank data. The embodiment is, however, not limited to this case, and may include a case where, for example, the cleaning water for the sample dispensing probe 206 or the cleaning water for the second reagent dispensing probe 210 is used. However, from the viewpoint of the amount of the water and the number of times of the measurement required for collecting the water blank data, the cleaning water for the first reagent dispensing probe 208 is preferably used. That is, since only a small amount of the cleaning water for the sample dispensing probe 206 is discharged at one time, more time is required for ensuring a sufficient amount of the water for the measurement. In the case of using the cleaning water for the second reagent dispensing probe 210, the number of times of the subsequent measurement is smaller than that in the case of using the cleaning water for the first reagent dispensing probe 208.

As described above, during the measurement, the control function 81 causes the cleaning water to be discharged into the reaction vessel 2011 not used for measuring the specimen so as to collect the water blank data. Accordingly, as illustrated in a lower diagram of FIG. 4, the reaction vessel 2011 in the automatic analysis apparatus 1 according to the present embodiment is not brought into an empty state (each empty cell in the diagram) during the measurement, and all the reaction vessels 2011 are each in a state of being filled with any one of the specimen, a detergent, and the water. The states illustrated in the lower diagram of FIG. 4 exclude a case where any one of the reaction vessels 2011 has not completed to be cleaned, for example, immediately after the start of the measurement.

The control function 81 calculates the water blank data by subtracting the cell blank data from the 33 photometric values obtained by applying the photometry 33 times to the reaction vessel 2011 with the cleaning water dispensed thereto. The control function 81 stores the calculated 33 pieces of the water blank data in the memory 7 so as to be associated with the ID of the reaction vessel 2011.

FIGS. 5A and 5B are charts illustrating examples of holding tables of the water blank data according to the first embodiment. FIG. 5A illustrates a holding table that holds the latest water blank data from each of the reaction vessels 2011. FIG. 5B illustrates a holding table that holds a history of the water blank data from a particular one of the reaction vessels 2011.

For example, the memory 7 holds the water blank data collected by the control function 81 in the form of the holding table illustrated in FIG. 5A. In other words, as illustrated in FIG. 5A, the memory 7 stores the holding table in which "WATER BLANK UPDATE DATE/TIME", "ABSORBANCE", "CELL BLANK", and "MEASUREMENT USE COUNT" are associated with "REACTION VESSEL NUMBER" representing the ID of the reaction vessel 2011. In the holding table of FIG. 5A stored in the memory 7, the data of the corresponding reaction vessel 2011 is updated to the latest data each time the water blank data is collected.

In FIG. 5A, "WATER BLANK UPDATE DATE/TIME" represents the latest update date and time of the water blank data. In FIG. 5A, "ABSORBANCE" represents all values of the absorbance (for example, 33 absorbance values) measured when the water blank data was collected. As illustrated in FIG. 5A, the absorbance in the holding table can include the coefficient of variation "CV". In that case, the control function 81 calculates the coefficient of variation based on the collected absorbance values.

In FIG. 5A, "CELL BLANK" represents the cell blank data collected after the cleaning. In FIG. 5A, "MEASUREMENT COUNT" represents the number of times used for measuring the specimen after the latest water blank data was collected.

For example, the memory 7 stores therein the water blank data collected by the control function 81 in the holding table illustrated in FIG. 5B. To take an example, as illustrated in FIG. 5B, the memory 7 stores therein the holding table in which "WATER BLANK UPDATE DATE/TIME", "ABSORBANCE", "CELL BLANK", and "MEASUREMENT USE COUNT" are associated with the reaction vessel 2011 of "REACTION VESSEL NUMBER: 1". The latest data is added to the holding table of FIG. 5B stored in the memory 7 each time the water blank data of the corresponding reaction vessel 2011 is collected.

In FIG. 5B, "WATER BLANK UPDATE DATE/TIME" represents the latest date and time of the water blank data. In FIG. 5B, "ABSORBANCE" represents all values of the absorbance (for example, 33 absorbance values) measured when the water blank data was collected. As illustrated in FIG. 5B, the absorbance in the holding table can include the coefficient of variation "CV". In that case, the control function 81 calculates the coefficient of variation based on the collected absorbance values.

In FIG. 5B, "CELL BLANK" represents the cell blank data collected after the cleaning. In FIG. 5B, "MEASUREMENT COUNT" represents the number of times used for measuring the specimen after the latest water blank data was collected.

The display control function 83 performs control to display the information on the collected water blank data. For example, the display control function 83 displays the water blank data collected from all the reaction vessels 2011 as at least one of a list and a graph. For example, the display control function 83 displays the history of the water blank data collected from a predetermined reaction vessel of the reaction vessels 2011 as at least one of a list and a graph.

As the display in the list, the display control function 83 can display, for example, the holding table illustrated in FIG. 5A or 5B on the display 5. The display control function 83 can also extract data from the holding table illustrated in FIG. 5A or 5B, and display only the extracted data as the list. The data to be extracted may be determined in advance, or may be optionally selected by the user.

Figure 6B:
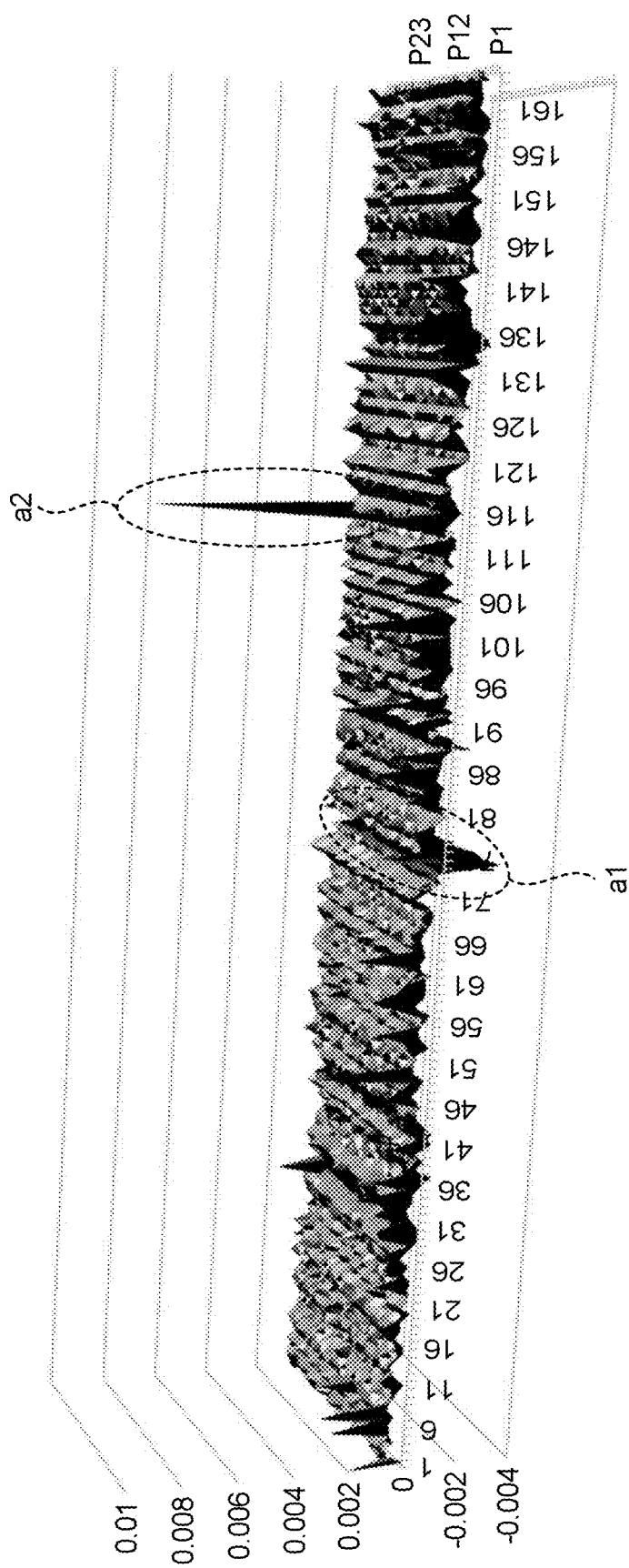
FIG. 6B is a diagram illustrating an example of another graphical representation of the water blank data according to the first embodiment.

As the display in the graph, the display control function 83 can display, for example, a graph illustrated in FIG. 6A or 6B on the display 5. FIGS. 6A and 6B are diagrams illustrating examples of the graphical representation of the water blank data according to the first embodiment. For example, as illustrated in FIG. 6A, the display control function 83 generates the graph representing the absorbance along the vertical axis and photometric points along the horizontal axis, and displays the graph on the display 5. In other words, the display control function 83 acquires the water blank data of the latest 33 points from the particular reaction vessel 2011, and uses the acquired water blank data to generate and display the graph illustrated in FIG. 6A. For example, the display control function 83 generates and displays the graph illustrated in FIG. 6A for one of the reaction vessels 2011 specified by the user through the input interface 4.

For example, as illustrated in FIG. 6B, the display control function 83 can generate a three-dimensional graph representing the latest water blank data of all the reaction vessels 2011, and display the three-dimensional graph on the display 5. In other words, the display control function 83 generates the graph representing the IDs of the reaction vessels 2011 along a first axis (axis in the horizontal direction), representing the photometric points along a second axis (axis in the depth direction), and representing the absorbance in a third axis (axis in the height direction), and displays the generated graph on the display 5.

Since the water blank data is measurements of the absorbance, all values thereof are theoretically constant values of nearly +0. Accordingly, if the values of the water blank data are dispersed, or unnaturally offset, the photometric system can be determined to be potentially abnormal. For example, if the absorbance of the water blank data is negative at all the photometric points as illustrated in an area a1 of FIG. 6B, the values of the cell blank data can be estimated to be greatly below the photometric values at the photometric points (P1 to P33). In other words, the measurement of the cell blank data is indicated to have been failed. If more than one of such reaction vessels 2011 frequently appear, the cleaning system for the reaction vessels 2011 is suspected to be not working normally. If only a particular reaction vessel 2011 is frequently brought into this situation, the particular reaction vessel 2011 is suspected to be scarred or heavily contaminated.

For example, if noise such as that illustrated in an area a2 of FIG. 6B frequently occurs only for a particular reaction vessel 2011, or the value of the CV for a particular reaction vessel 2011 is very high, the particular reaction vessel 2011 is suspected to have a problem. If, instead, the above-mentioned situation occurs for more than one of the reaction vessels 2011, a suspicion is raised, for example, that the light source has deteriorated, that a mechanism for holding the reaction disc 201 is abnormal, or that a solution filled in a constant temperature bath is contaminated.

For example, if the above-mentioned situation occurs for only successive ones of the reaction vessels 2011, for example, a unit including the successive reaction vessels 2011 is suspected to be not appropriately set on the reaction disc 201. If the noise such as that illustrated in the area a2 is observed at a small number (for example, one) of the photometric points, dust, bubbles, or the like can be considered as an influence.

As described above, the display control function 83 can display the information on the collected water blank data and the information on the cell blank data as, for example, the lists and the graphs. In addition to displaying the above-described pieces of information, the display control function 83 can also perform display control to, for example, display information suggesting the occurrence of the abnormality in a highlighted manner. For example, the display control function 83 can issue an error notification about the reaction vessel 2011 in which a cell blank value is not within a predetermined range. For example, in the list display of, for example, FIG. 5A, the display control function 83 can display the reaction vessel 2011 suggested to be abnormal in a colored manner. For example, in the graph display of, for example, FIG. 6B, the display control function 83 can display each of the area a1 and the area a2 in a changed color.

The following describes processing performed by the automatic analysis apparatus 1 according to the first embodiment using FIGS. 7 and 8. FIGS. 7 and 8 are flowcharts for explaining a procedure of the processing performed by the automatic analysis apparatus 1 according to the first embodiment. FIG. 8 is a flowchart for explaining details of the processing at Step S102 in FIG. 7.

Steps S101 to S108 illustrated in FIG. 7 and Steps S10201 to S10210 illustrated in FIG. 8 are steps implemented by the processing circuitry 8 that reads and executes a computer program corresponding to the control function 81 from the memory 7.

As illustrated in FIG. 7, in the automatic analysis apparatus 1, the processing circuitry 8 first determines whether the measurement has started (Step S101). For example, the processing circuitry 8 determines whether the measurement has started by determining whether, for example, a button for starting the measurement is pressed through the input interface 4. If the measurement is determined to have started (Yes at Step S101), the processing circuitry 8 determines use of the reaction vessel 2011 disposed in the sample discharge position (Step S102). The automatic analysis apparatus 1 is in a standby state until the measurement starts (No at Step S101).

The processing circuitry 8 subsequently determines whether the determined use is for the water blank (Step S103). If the determined use is for the water blank (Yes at Step S103), the processing circuitry 8 performs control to dispense the water into the reaction vessel 2011 (Step S104), and apply the photometry each time the reaction vessel 2011 passes through the photometric unit 220 (Step S105).

The processing circuitry 8 determines whether the reaction vessel 2011 has reached a photometry end position (Step S106). For example, the processing circuitry 8 determines whether the reaction vessel 2011 has reached the cleaning unit 230 to determine whether the reaction vessel 2011 has reached the photometry end position. If the reaction vessel 2011 has not reached the photometry end position (No at Step S106), the processing circuitry 8 applies the photometry when the reaction vessel 2011 passes through the photometric unit 220.

If the reaction vessel 2011 has reached the photometry end position (Yes at Step S106), the processing circuitry 8 determines whether the measurement has ended (Step S107). For example, the processing circuitry 8 determines whether the measurement has ended by determining whether, for example, a button for ending the measurement is pressed through the input interface 4.

If the measurement has not ended (No at Step S107), the processing circuitry 8 performs the processing at Step S102 again to determine the use of the reaction vessel 2011. If the measurement has ended (No at Step S107), the processing circuitry 8 ends the processing. If, at Step S103, the reaction vessel 2011 is not for the water blank (No at Step S103), the processing circuitry 8 performs the cell blank measurement, the specimen measurement, or the cleaning according the determined use (Step S108).

The following describes the details of the processing at Step S102. For example, in the automatic analysis apparatus 1, as illustrated in FIG. 8, the processing circuitry 8 first determines whether the cell blank value has been measured for the reaction vessel 2011 disposed in the sample discharge position (Step S10201). If the cell blank value has not been measured (No at Step S10201), the processing circuitry 8 sets the reaction vessel 2011 to be subjected to no dispensing (Step S10202).

If the processing circuitry 8 determines that the cell blank value has been measured (Yes at Step S10201), the processing circuitry 8 determines whether the cell blank value is within the predetermined range (Step S10203). If the cell blank value is not within the predetermined range (No at Step S10203), the processing circuitry 8 issues the error notification that the reaction vessel is abnormal (Step S10204), and sets the reaction vessel 2011 to be subjected to the dispensing of the cleaning water (Step S10209).

If the processing circuitry 8 determines that the cell blank value is within the predetermined range (Yes Step S10203), the processing circuitry 8 determines whether the reaction vessel 2011 needs to be cleaned (Step S10205). If the reaction vessel 2011 needs to be cleaned (Yes at S10205), the processing circuitry 8 sets the reaction vessel 2011 to be subjected to the dispensing of the detergent (Step S10206).

If the reaction vessel 2011 does no need to be cleaned (No at S10205), the processing circuitry 8 determines whether a measurement request is made (Step S10207). If a measurement request is not made (No at Step S10207), the processing circuitry 8 sets the reaction vessel 2011 to be subjected to the dispensing of the cleaning water (Step S10209).

If the processing circuitry 8 determines that a measurement request is made (Yes at Step S10207), the processing circuitry 8 determines whether the water blank data needs to be reacquired (Step S10208). For example, the processing circuitry 8 determines whether any one of the above-described conditions is satisfied to determine whether the water blank data needs to be reacquired. If the processing circuitry 8 determines that the water blank data needs to be reacquired (Yes at Step S10208), the processing circuitry 8 sets the reaction vessel 2011 to be subjected to the dispensing of the cleaning water (Step S10209). If the water blank data does not need to be reacquired (No at Step S10208), the processing circuitry 8 sets the reaction vessel 2011 to be subjected to the specimen measurement (Step S10210).

As described above, according to the first embodiment, the reaction disc 201 movably holds the reaction vessels 2011. The sample dispensing probe 206 dispenses the analyte into one of the reaction vessels 2011. The first reagent dispensing probe 208 dispenses the reagent into the reaction vessel 2011. The photometric unit 220 emits the light to the reaction vessel 2011, and detects the transmitted light. The memory 7 stores therein the test order. Based on the test order, the control function 81 controls the reaction disc 201, the sample dispensing probe 206, and the first reagent dispensing probe 208. Based on the test order, the control function 81 determines one of the reaction vessels 2011 to be used for measuring the analyte, and performs control to dispense the water into the other reaction vessels 2011 not used for the measurement of the analyte so as to collect the water blank data while the analyte is measured. Accordingly, the automatic analysis apparatus 1 according to the first embodiment can automatically collect the water blank data from all the reaction vessels without affecting the measurement processing.

According to the first embodiment, the control function 81 determines the reaction vessel 2011 to be used for measuring the analyte based on the status of use of the reaction vessel 2011 or the result of measurement using the reaction vessel 2011, and performs control to collect the water blank data by dispensing the water into the reaction vessel 2011 not used for measuring the analyte. Accordingly, the automatic analysis apparatus 1 according to the first embodiment can automatically collect the water blank data from the reaction vessels 2011 from which the water blank data needs to collected, while prioritizing the measurement of the specimen.

According to the first embodiment, the control function 81 performs control to collect the water blank data from the reaction vessel 2011 from any one of the reaction vessels 2011 from which no water blank data has been collected for the predetermined period, instead of using the reaction vessel 2011 for measuring the analyte. Accordingly, the automatic analysis apparatus 1 according to the first embodiment can automatically collect the water blank data from all the reaction vessels 2011.

According to the first embodiment, the control function 81 has the determination function to determine whether the collected water blank data is normal or abnormal, and performs control to collect the water blank data from the reaction vessel 2011 with the water blank data determined to be abnormal, instead of using the reaction vessel 2011 for measuring the analyte. For example, the control function 81 performs control to collect the water blank data from the reaction vessel 2011 for which the variation in the collected water blank data thereof exceeds the predetermined range, instead of using the reaction vessel 2011 for measuring the analyte. Accordingly, the automatic analysis apparatus 1 according to the first embodiment can re-apply the water blank test to the potentially abnormal reaction vessel 2011, instead of using the reaction vessel 2011 for the specimen measurement.

According to the first embodiment, the control function 81 determines, based on the collected water blank data, whether the cell blank data has been successfully collected, and performs control to collect the water blank data from the reaction vessel 2011 from which the cell blank data has failed to be collected, instead of using the reaction vessel 2011 for measuring the analyte. Accordingly, the automatic analysis apparatus 1 according to the first embodiment can detect the reaction vessel 2011 from which the cell blank data has failed to be collected.

According to the first embodiment, the control function 81 performs control to collect the water blank data from the reaction vessel 2011 in which the analyte has been measured more times than the predetermined number of times after the water blank data was collected, instead of using the reaction vessel 2011 for measuring the analyte. Accordingly, the automatic analysis apparatus 1 according to the first embodiment can automatically collect the water blank data from the reaction vessel 2011 in which contamination may be accumulated.

According to the first embodiment, the control function 81 performs control to collect the water blank data from the reaction vessel 2011 with the predetermined reagent dispensed thereto, instead of using the reaction vessel 2011 for measuring the analyte. Accordingly, the automatic analysis apparatus 1 according to the first embodiment can automatically collect the water blank data from the reaction vessel 2011 that may be contaminated.

According to the first embodiment, the control function 81 determines whether the result of the measurement of the analyte is abnormal, and performs control to collect the water blank data from the reaction vessel 2011 for which the result of the measurement of the analyte therein is determined to be abnormal, instead of using the reaction vessel 2011 for measuring the analyte. Accordingly, the automatic analysis apparatus 1 according to the first embodiment can determine whether the abnormality in the result of the measurement of the analyte is caused by the equipment.

According to the first embodiment, the control function 81 performs control to collect the water blank data from the reaction vessel 2011 for which the cell blank data collected therefrom exceeds the predetermined range, instead of using the reaction vessel 2011 for measuring the analyte. Accordingly, the automatic analysis apparatus 1 according to the first embodiment can determine a cause of the abnormality in the cell blank data. For example, the automatic analysis apparatus 1 can detect the contamination attached to the reaction vessel 2011.

According to the first embodiment, the display control function 83 performs control to display the information on the collected water blank data. Accordingly, the automatic analysis apparatus 1 according to the first embodiment provides the information to the user to enable understanding of the state of the automatic analysis apparatus 1.

According to the first embodiment, the display control function 83 displays the water blank data collected from all the reaction vessels 2011 as at least one of the list and the graph. Accordingly, the automatic analysis apparatus 1 according to the first embodiment enables the understanding of the state of all the reaction vessels 2011 in the automatic analysis apparatus 1.

According to the first embodiment, the display control function 83 displays the history of the water blank data collected from the predetermined reaction vessel 2011 of the reaction vessels 2011 as at least one of a list and a graph. Accordingly, the automatic analysis apparatus 1 according to the first embodiment enables the detailed understanding of the state of the particular reaction vessel 2011 in the automatic analysis apparatus 1.

In the above-described first embodiment, depending on the determination result of the use of the reaction vessel 2011, the measurement of the analyte may be postponed, and instead, the collection of the water blank data may be started. In that case, to notify the user of the postponement of the measurement, the automatic analysis apparatus 1 according to the first embodiment may perform the following processing. For example, when the control function 81 performs control to postpone the start of the measurement of the analyte, and instead, to start the collection of the water blank data, the control function 81 causes the display control function 83 to display that the start of the measurement of the analyte is postponed.

Other Embodiments

Various embodiments other than the above-described embodiment may be carried out.

The above embodiment has been described for the case where, after the determination is made as to whether to collect the water blank data, the cleaning water is discharged from the first reagent dispensing probe 208 (or the second reagent dispensing probe 210, or the sample dispensing probe 206) into the reaction vessel 2011 from which the water blank data is to be collected, and the water blank data is collected by the photometric unit 220. The embodiment is, however, not limited to this case, and may include, for example, a case of using the water having used for cleaning the reaction vessel 2011 or any one of the probes.

In that case, for example, the control function 81 determines whether to collect the water blank data of the reaction vessel 2011 while the cleaning water is contained therein after the water blank data of the reaction vessel 2011 is cleaned in the reaction vessel cleaning position, instead of suctioning the cleaning water as the waste liquid from the reaction vessel 2011. If the water blank data is determined to be collected, the control function 81 performs control to collect the water blank data as it is using the photometric unit 220.

The automatic analysis apparatus 1 stands by in the state in which the water has been dispensed into the reaction vessel 2011 while the analysis is not performed. Thus, the control function 81 performs control to use the water having been dispensed into the reaction vessel 2011 to collect the water blank data. In that case, for example, the control function 81 determines whether to collect the water blank data of the reaction vessel 2011 while the water is contained therein, instead of suctioning the water having been dispensed during the standby period as the waste liquid even when the analysis is started. If the water blank data is determined to be collected, the control function 81 performs control to collect the water blank data as it is using the photometric unit 220.

In this way, the automatic analysis apparatus 1 uses the water used for cleaning the reaction vessels or the probes so as to be capable of reducing the amount of use of the water as water when the water blank data is collected.

The above embodiment has been described for the case of using the water blank data as the characteristic data. The embodiment is, however, not limited to this case, and may include, for example, a case of using an aqueous solution in a known color or air. For example, if an aqueous solution having known absorbance is disposed in the reagent containers 101, and the control function 81 determines to collect the characteristic data, the control function 81 performs control to discharge the aqueous solution from the first reagent dispensing probe 208 to the reaction vessels 2011. With this configuration, the automatic analysis apparatus 1 can collect the characteristic data in addition to the water blank data, and thus can obtain more detailed data to finely analyze the state of the reaction vessels 2011.

For example, the above embodiment has been described for the case where the automatic analysis apparatus 10 includes the input interface 4, the display 5, the printer 6, the memory 7, and the processing circuitry 8. The embodiment is, however, not limited to this case. For example, the functions of the input interface 4, the display 5, the printer 6, the memory 7, and the processing circuitry 8 are substitutable by functions of an information processing apparatus, such as a personal computer or a workstation, and an external printer for the automatic analysis apparatus 1. For example, if the information processing apparatus and the external printer are connected to the automatic analysis apparatus 1, the functions of the input interface 4, the display 5, the printer 6, the memory 7, and the processing circuitry 8 are respectively substitutable by an input interface, a display, a memory, and processing circuitry of the information processing apparatus, and the function of the printer 6 is substitutable by the external printer. The automatic analysis apparatus 1 need not include the input interface 4, the display 5, the printer 6, the memory 7, and the processing circuitry 8 if these functions are substituted by the functions of the information processing apparatus and the external printer.

The term "processor" used in the above description refers to, for example, a central processing unit (CPU), a graphics processing unit (GPU), or a circuit, such as an application specific integrated circuit (ASIC), a programmable logic device (for example, a simple programmable logic device (SPLD)), a complex programmable logic device (CPLD), or a field programmable gate array (FPGA). The processor reads and executes a computer program stored in the memory to implement the function thereof. The computer program may be directly incorporated in the circuitry of the processor instead of storing the computer program in the memory 7. In this case, the processor reads and executes the computer program incorporated in the circuitry to implement the function thereof. The processors of the present embodiments are not limited to a case of being configured as a single circuit on a processor-by-processor basis. Instead, a plurality of independent circuits may be combined to be configured as one processor to implement the functions thereof. Moreover, a plurality of components in the drawings may be integrated into one processor to implement the functions thereof.

The components of the devices illustrated in the drawings are merely functionally conceptual, and need not be physically configured as illustrated in the drawings. In other words, the specific modes of distribution and integration of the devices are not limited to those illustrated in the drawings, and all or some of the devices can be configured in a functionally or physically distributed or integrated manner in any units according to various types of loads or use conditions. Furthermore, all or any part of the processing functions performed by the devices can be implemented by a CPU or a computer program that is analyzed and executed by the CPU, or can be implemented as hardware based on a wired logic.

Of the processes described in the above embodiments, all or some of the processes described as automatically performed can also be manually performed, or all or some of the processes described as manually performed can also be automatically performed using known methods. In addition, the processing procedures, the control procedures, the specific names, and the information including various types of data and parameters illustrated in the above description and the drawings can be freely modified unless otherwise specified.

The automated analysis method described in the above embodiments can be carried out by executing a control program prepared in advance on a computer, such as a personal computer or a workstation. The control program can be distributed through a network, such as the Internet. The control program can also be executed by being recorded on a computer-readable recording medium, such as a hard disk, a flexible disk (FD), a compact disc read-only memory (CD-ROM), a magneto-optical disk (MO), or a digital versatile disc (DVD), and being read from the recording medium by the computer.

According to at least one of the embodiments described above, the characteristic data for each of the reaction vessels can be automatically collected without affecting the measurement processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analysis apparatus comprising:
    a holder including a plurality of reaction vessels;
    a first dispenser configured to dispense an analyte into each of the reaction vessels;
    a second dispenser configured to dispense a reagent into each of the reaction vessels;
    a detector configured to detect light transmitted through each of the reaction vessels; and
    processing circuitry configured to control the holder, the first dispenser, and the second dispenser based on a test order that indicates a measurement content for the analyte, wherein
    the processing circuitry is configured to
        determine, among the plurality of reaction vessels, at least one reaction vessel to be used for measuring the analyte based on the test order,
        perform control to collect characteristic data from at least one reaction vessel that is not used for measuring the analyte among the plurality of reaction vessels while the analyte is measured, the characteristic data being data that indicates a state of the at least one reaction vessel, and
        determine the at least one reaction vessel to be used for measuring the analyte such that characteristic data is collected for all of the plurality of reaction vessels after performing a plurality of tests corresponding to a plurality of test orders.

2. The automatic analysis apparatus according to claim 1, wherein the processing circuitry is configured to
    determine the at least one reaction vessel to be used for measuring the analyte based on a status of use of the reaction vessel or a result of measurement using the reaction vessel, and
    perform control to collect the characteristic data from the at least one reaction vessel not used for measuring the analyte.

3. The automatic analysis apparatus according to claim 2, wherein the processing circuitry is configured to perform control to collect the characteristic data from at least one reaction vessel from which no characteristic data has been collected for a predetermined period, instead of using the reaction vessel for measuring the analyte.

4. The automatic analysis apparatus according to claim 2, wherein the processing circuitry is configured to
    determine whether the collected characteristic data is normal or abnormal, and
    perform control to collect the characteristic data from the reaction vessel with the characteristic data determined to be abnormal, instead of using the reaction vessel for measuring the analyte.

5. The automatic analysis apparatus according to claim 2, wherein the processing circuitry is configured to
    determine, based on the collected characteristic data, whether cell blank data has been successfully collected, and
    perform control to collect the characteristic data from the reaction vessel from which the cell blank data has failed to be collected, instead of using the reaction vessel for measuring the analyte.

6. The automatic analysis apparatus according to claim 2, wherein the processing circuitry is configured to perform control to collect the characteristic data from any one of the reaction vessels in which the analyte has been measured more times than a predetermined number of times after the characteristic data was collected, instead of using the reaction vessel for measuring the analyte.

7. The automatic analysis apparatus according to claim 2, wherein the processing circuitry is configured to perform control to collect the characteristic data from any one of the reaction vessels with a predetermined reagent dispensed thereto, instead of using the reaction vessel for measuring the analyte.

8. The automatic analysis apparatus according to claim 2, wherein the processing circuitry is configured to
    determine whether the result of the measurement of the analyte is abnormal, and
    perform control to collect the characteristic data from the reaction vessel for which the result of the measurement of the analyte therein is determined to be abnormal, instead of using the reaction vessel for measuring the analyte.

9. The automatic analysis apparatus according to claim 2, wherein the processing circuitry is configured to perform control to collect the characteristic data from any one of the reaction vessels for which the cell blank data collected therefrom exceeds a predetermined range, instead of using the reaction vessel for measuring the analyte.

10. The automatic analysis apparatus according to claim 1, wherein the processing circuitry is configured to further perform control to display information on the collected characteristic data.

11. The automatic analysis apparatus according to claim 10, wherein the processing circuitry is configured to cause a display to display the characteristic data collected from all the reaction vessels as at least one of a list or a graph.

12. The automatic analysis apparatus according to claim 10, wherein the processing circuitry is configured to cause a display to display a history of the characteristic data collected from a predetermined reaction vessel of the plurality of reaction vessels as at least one of a list or a graph.

13. The automatic analysis apparatus according to claim 1, wherein the processing circuitry is configured to, when performing control to postpone a start of the measurement of the analyte, and, instead, to start collecting the characteristic data, cause a display to display information in which the start of the measurement of the analyte is postponed.

14. The automatic analysis apparatus according to claim 1, wherein the processing circuitry is configured to perform control to dispense water into the at least one reaction vessel not used for measuring the analyte so as to collect water blank data while the analyte is measured.

15. The automatic analysis apparatus according to claim 1, wherein the processing circuitry is configured to perform control to collect water blank data from the at least one reaction vessel with cleaning water dispensed thereto.

* * * * *